United States Patent
Van de Wetering

(10) Patent No.: US 9,844,988 B2
(45) Date of Patent: Dec. 19, 2017

(54) ROAD TRACTOR SEMI-TRAILER COMBINATION

(71) Applicant: Martinus Theodorus Van de Wetering, Lithoijen (NL)

(72) Inventor: Martinus Theodorus Van de Wetering, Lithoijen (NL)

(*) Notice: Subject to any disclaimer, the term of this patent is extended or adjusted under 35 U.S.C. 154(b) by 419 days.

(21) Appl. No.: 14/398,816

(22) PCT Filed: May 3, 2013

(86) PCT No.: PCT/NL2013/050335
§ 371 (c)(1),
(2) Date: Nov. 4, 2014

(87) PCT Pub. No.: WO2013/180562
PCT Pub. Date: Dec. 5, 2013

(65) Prior Publication Data
US 2015/0084311 A1    Mar. 26, 2015

(30) Foreign Application Priority Data

May 15, 2012  (NL) ...................... 2008825
Dec. 11, 2012 (NL) ...................... 2009960

(51) Int. Cl.
*B60D 1/01* (2006.01)
*B62D 53/08* (2006.01)
*B60D 1/58* (2006.01)

(52) U.S. Cl.
CPC .............. *B60D 1/58* (2013.01); *B60D 1/015* (2013.01); *B62D 53/0842* (2013.01); *B62D 53/0871* (2013.01)

(58) Field of Classification Search
CPC .. B62D 15/023; B62D 53/08; B62D 53/0842; B62D 53/10; B60D 1/015; B60D 1/58
(Continued)

(56) References Cited

U.S. PATENT DOCUMENTS 4,147,372 A * 4/1979 Sumpter .................. B60D 1/44
                                                    280/433
5,856,887 A * 1/1999 Standen .................. B60R 11/00
                                                    280/432
(Continued)

FOREIGN PATENT DOCUMENTS

DE    102009027036    12/2010
EP         0471286     2/1992
WO    2010/019027 *   2/2010 ............. B62D 53/08

*Primary Examiner* — Anne Marie Boehler
(74) *Attorney, Agent, or Firm* — PatShegen IP

(57) ABSTRACT

A road tractor semi-trailer combination 1 is equipped with a system for detecting the position of a road tractor relative to a semi-trailer. This system comprises a magnet 13 which is accommodated in the center of the bottom of the kingpin and a sensor unit 11 which is fixed to the bottom of the fifth wheel 9.
The sensor unit can be displaced between a resting position at a distance from the magnet where the position of the magnet cannot be detected, and an operating position at a distance from the magnet where the position of the magnet can be detected indeed.
The fifth wheel is equipped with a handle for displacing a locking pawl which locks the kingpin in the fifth wheel in coupled state of the road tractor and the semi-trailer. This handle is connected via a pulling cable to the sensor unit for displacing the sensor unit to the operating position simultaneously with the displacement of the locking pawl.

8 Claims, 3 Drawing Sheets

(58) Field of Classification Search
USPC .................................... 280/432, 433, 446.1
See application file for complete search history.

(56) References Cited

U.S. PATENT DOCUMENTS

| | | | |
|---|---|---|---|
| 7,384,056 B2* | 6/2008 | Anderson | B62D 53/10 |
| | | | 280/433 |
| 7,793,965 B2* | 9/2010 | Padula | B62D 13/025 |
| | | | 280/426 |
| 2004/0032111 A1* | 2/2004 | Sanchez | B62D 53/12 |
| | | | 280/433 |
| 2004/0075241 A1* | 4/2004 | Alguera | B62D 53/10 |
| | | | 280/432 |
| 2005/0093314 A1* | 5/2005 | McGrew | B62D 53/08 |
| | | | 294/26 |
| 2006/0145450 A1* | 7/2006 | Metternich | B62D 15/02 |
| | | | 280/433 |
| 2008/0184577 A1 | 8/2008 | Spratte et al. | |

\* cited by examiner

ROAD TRACTOR SEMI-TRAILER COMBINATION

FIELD OF THE INVENTION

The invention relates to a road tractor semi-trailer combination of which the road tractor comprises a fifth wheel and the semi-trailer comprises a kingpin which can be coupled to the fifth wheel and at the bottom has a marker, which road tractor semi-trailer combination further includes a sensor unit connected to the fifth wheel for detecting the position of the marker relative to the fifth wheel, which sensor unit comprises a sensor for detecting the marker.

STATE OF THE ART

A road tractor semi-trailer combination of this type is known from WO2010/019027A1. In this known combination a recess is provided in the bottom of the kingpin and a unit comprises a pivot congruent with the recess, which pivot can be rotated and be displaced in axial direction. The pivot has the shape of a screwdriver and fits completely in the recess only in one or two positions. When the pivot is inserted into the recess, the pivot rotates by itself to one of the positions in which the pivot is completely lodged in the recess. The pivot is self-seeking in the recess. By measuring the angle of twist of the pivot and the recess relative to each other, the position of the road tractor relative to the semi-trailer can be detected.

SUMMARY OF THE INVENTION

It is an object of the invention to provide a road tractor semi-trailer combination of the type defined in the opening paragraph with which the position of the semi-trailer relative to the road tractor can be detected in a simpler and more reliable way. For this purpose, the combination according to the invention is characterized in that the marker is formed by a magnet or a coil of electro-conductive wire which is located in the middle of the bottom of the kingpin, and the sensor comprises a coil and/or a magnet by which the position of the coil or magnet can be detected, and in that the road tractor semi-trailer combination comprises displacement means for displacing the sensor from a resting position underneath the kingpin at a first distance from the marker, in which the sensor is incapable of detecting the position of the marker during the coupling and/or immediately after the coupling of the semi-trailer to the road tractor, to an operating position in which the sensor is located at a second distance from the marker, in which the sensor is capable indeed of detecting the position of the marker. The resting position is, for example, a retracted position underneath the kingpin.

In the case where the marker is formed by a magnet, the sensor is arranged as a coil. The marker, however, may also be arranged as a coil instead of a magnet. In that case the sensor is to generate a magnetic field so as to generate a current in the marker coil. This current passing through the coil then generates a magnetic field in the coil which can be detected by a further sensor-accommodated coil for detecting the position of the marker. The magnetic field generated by the sensor may be obtained by a permanent magnet or again by a coil.

The sensor does not have moving parts, so that it is reliable. Neither is it necessary for the sensor to contact the marker, so that the presence of dirt between the sensor and the marker does not immediately lead to disturbances or faulty measurements.

A suitable sensor for determining the position of a magnet centrically fitted in the kingpin is an inductive angle sensor, for example manufactured by Messrs. Hans Turck GmbH & Co.KG.

A minor deviation in the position of the kingpin in locked state in the fifth wheel relative to the right operating position of the sensor is detected by the sensor as a faulty locking of the kingpin in the fifth wheel, by which it may be avoided that the semi-trailer is disengaged during the ride.

An embodiment of the combination according to the invention is characterized in that the fifth wheel comprises a bridge element as well as a spring by which the sensor unit is connected to the bridge element, the sensor unit in operating position being pushed against the bottom of the kingpin by the spring. In the resting position of the sensor, the sensor is pulled downwards against the spring force to a spot at a larger distance from the marker in the kingpin. In the operating position the sensor is pushed towards the marker by the spring, during which operation the spring is partly extended and pushes the sensor unit against the marker with minimal force.

A further embodiment of the combination according to the invention is characterized in that the fifth wheel is provided with a locking pawl which can be displaced between a locking position in which the kingpin is locked in the fifth wheel in coupled state of the road tractor and the semi-trailer, and a release position in which the kingpin can be displaced into and out of the fifth wheel, where the displacement means are formed by coupling means which couple the sensor unit to the locking pawl so that in the event of the locking pawl being displaced between the release position and the locking position the sensor unit is displaced between the resting position and the operating position. By utilizing for the displacement of the sensor unit the already standard available displacement means for displacing the locking pawl, no separate displacement means need be installed for the displacement of the sensor unit.

A still further embodiment of the combination according to the invention is characterized in that the fifth wheel is provided with a handle for pre-tensioning a spring and thus displacing the locking pawl from the locking position to the release position, and for transferring the sensor unit from the operating position to the resting position, which spring, when extended, displaces the locking pawl from the release position to the locking position, and thus displaces the sensor unit from the resting position to the operating position. This spring is coupled to an activating pin which is displaced by the kingpin during the coupling of the semi-trailer to the road tractor. By utilizing for the displacement of the sensor unit the already available handle for locking the kingpin in the fifth wheel, no further mechanism is needed to carry out this displacement. The displacement means preferably comprise a cable by which the sensor unit is connected to the handle.

In lieu of utilizing a handle and a spring for displacing the sensor unit, the fifth wheel may also be provided with a displacement unit for displacing the sensor unit to the operating position in a hydraulic, pneumatic, or electromagnetic manner. In this embodiment the fifth wheel is also provided with a handle for displacing a locking pawl which locks the kingpin in the fifth wheel in coupled state of road tractor and semi-trailer, where the displacement unit is activated by the handle during or immediately after the displacement of the locking pawl.

Another embodiment in which the sensor unit is displaced mechanically is characterized in that the displacement means comprise a lever against which the kingpin pushes when the road tractor is coupled to the semi-trailer and while doing so displaces the sensor unit from the resting position to the operating position. The resting position is in this case the position in which the springs are fully expanded.

In yet a further embodiment the road tractor comprises a plug unit as well as an arcuate rail along which the plug unit can be displaced, where the centre of the arc of circle is located in the centre of the kingpin of the coupled road tractor semi-trailer combination, and the semi-trailer has a female plug unit which is located at a distance from the centre of the kingpin, which distance equals the radius of the arc of circle along which the rail is extended. In this embodiment the road tractor further includes further displacement means for displacing the plug unit along the rail, as well as a control unit for controlling the further displacement means for displacing the plug unit to below the female plug unit based on the signals received by the sensor unit, and coupling means for coupling the plug unit to the female plug unit. This control unit will not start functioning until the pivot has been completely lodged in the recess.

The sensor unit is preferably coupled to the central control unit already present on the road tractor for inter alia simultaneously and separately controlling for example the following parts:
  self-steering axles of the semi-trailer,
  cornering mirrors on the road tractor,
  cornering reversing lights on the road tractor,
  automatic coupling system for coupling electricity cables and air brake hoses between the road tractor and the semi-trailer.

This control is preferably effected via the electronics already present on the road tractor.

BRIEF DESCRIPTION OF THE DRAWINGS

The invention will now be described in more detail below based on an example of embodiment of the road tractor semi-trailer combination and the system according to the invention while reference is made to the appended drawing figures, in which.

DETAILED DESCRIPTION OF THE DRAWINGS

Figure 1:
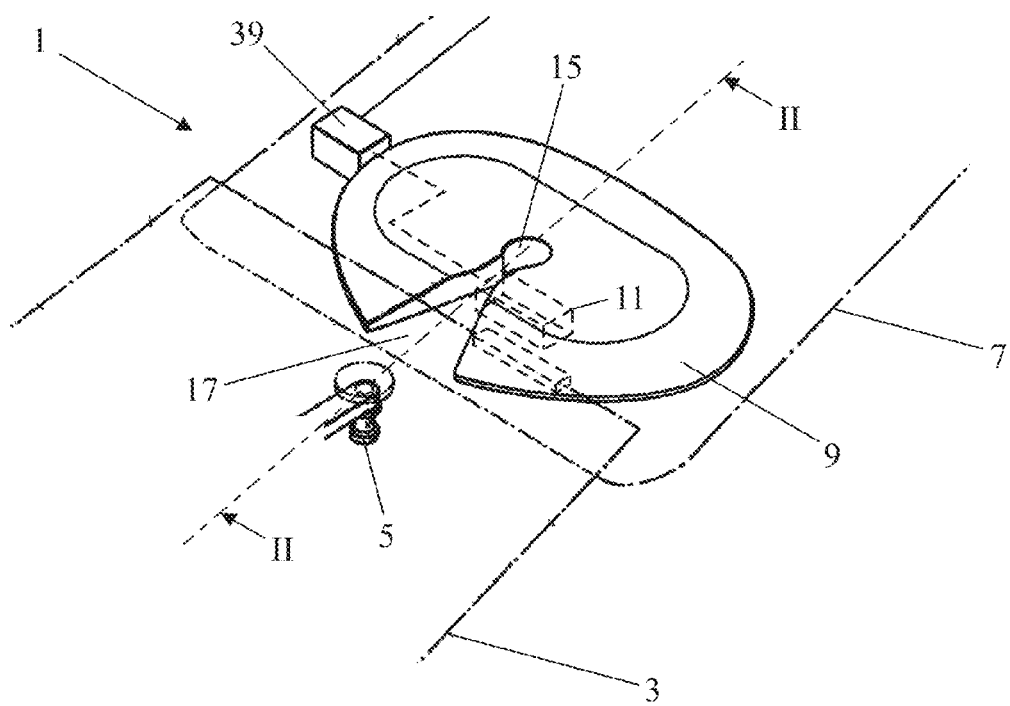
FIG. 1 shows a perspective view of a part of a road tractor semi-trailer combination according to the invention before the road tractor is coupled to the semi-trailer.

FIG. 1 shows a perspective view of a part of the road tractor semi-trailer combination 1 according to the invention briefly before the road tractor is coupled to the semi-trailer. To the bottom of the semi-trailer 3 is fitted a kingpin and a fifth wheel 9 is present on the road tractor 7. A sensor unit 11 is fitted in the middle to the bottom of the fifth wheel. The kingpin and the sensor unit form part of a system for measuring the position of the semi-trailer relative to the road tractor.

Figure 2:
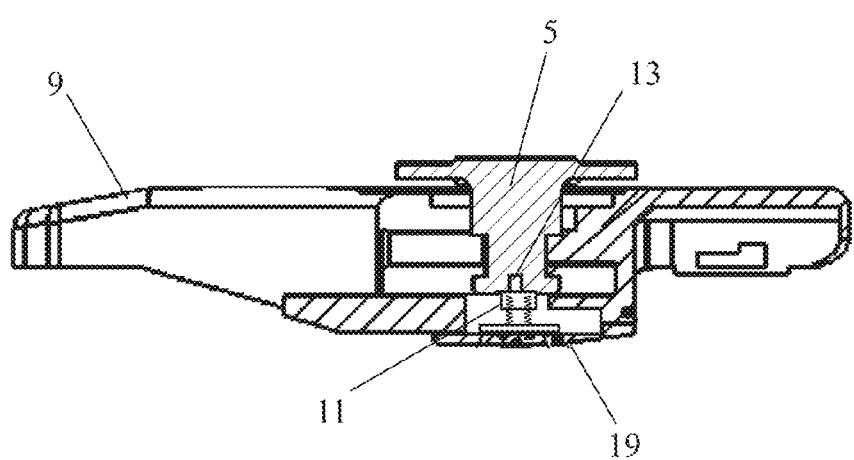
FIG. 2 shows a sectional view along the line II-II in FIG. 1, after the road tractor has been coupled to the semi-trailer.

FIG. 2 shows a sectional view of the kingpin and the fifth wheel along the line II-II shown in FIG. 1, after the road tractor has been coupled to the semi-trailer.

The bottom of the king pin 5 has a hole in the middle in which a magnet 13 is accommodated. The sensor unit 11 is equipped with an inductive sensor and is present in the place of the central hole 15 in the fifth wheel 9 underneath the fifth wheel. From this central hole 15 extends a widening recess 17 (see FIG. 1) for accommodating the kingpin 5 when the road tractor 7 is being coupled to the semi-trailer 3 and for leading the kingpin to the central hole 15.

Figure 3:
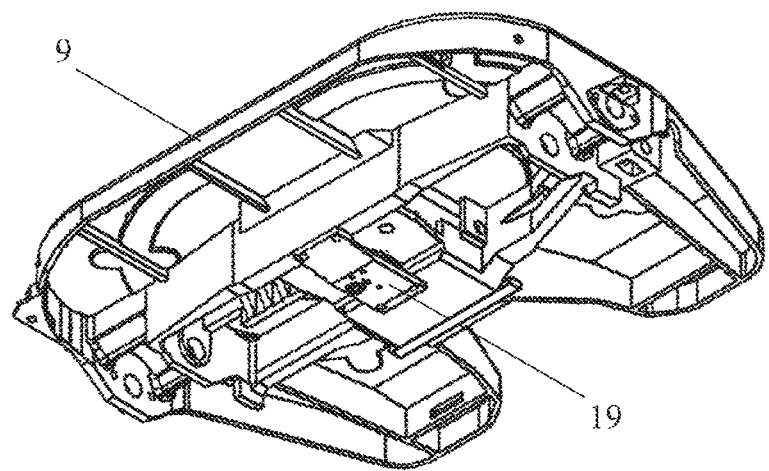
FIG. 3 shows the fifth wheel with the sensor unit fitted to the bottom thereof.
Figure 4:
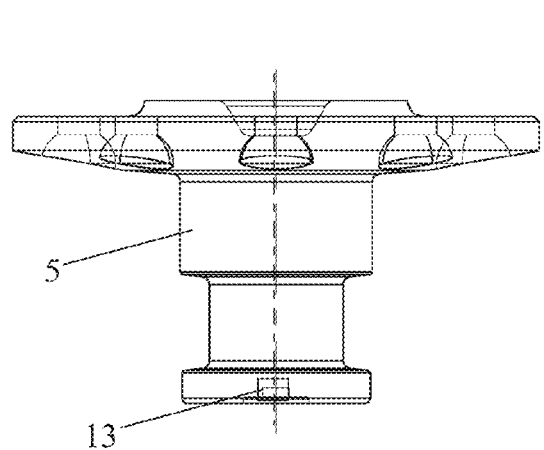
FIG. 4 shows a detailed view of the kingpin.
Figure 5:
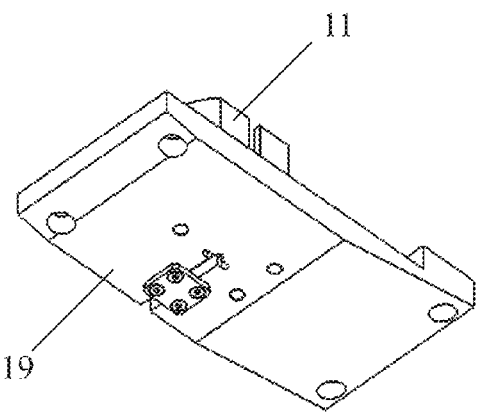
FIG. 5 shows a perspective view of a bridge element with the sensor unit.
Figure 6:
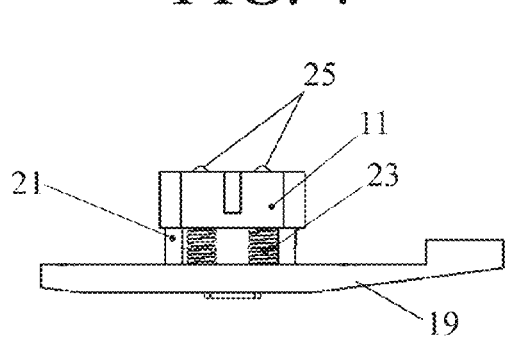
FIG. 6 shows a sectional view of the bridge element with the sensor unit.
Figure 7:
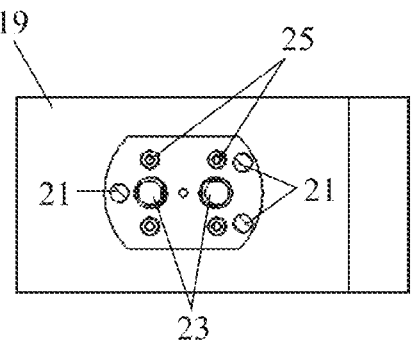
FIG. 7 shows a top plan view of the bridge element with the sensor unit.

FIG. 3 shows the fifth wheel with the sensor unit fitted to the bottom of the fifth wheel. A bridge element 19 is fitted to the bottom of the fifth wheel 9 on which bridge element are located guide pins 21 along which the sensor unit can be displaced. For illustrative purposes FIG. 4 shows the kingpin with the magnet accommodated in it and FIGS. 5, 6 and 7 show the bridge element with the sensor unit in perspective view, longitudinal section, and top plan view respectively. Helical springs 23 are located between the sensor unit and the bridge element, which helical springs push the sensor unit against the bottom of the king pin. The top of the sensor unit has protrusions 25 by which the sensor unit in operating position pushes against the bottom of the kingpin. As a result of these protrusions the sensor located in the sensor unit is situated at the right distance to the magnet and dirt between the sensor unit and the magnet does not immediately have an effect on the distance between the sensor and the magnet.

Figure 8:
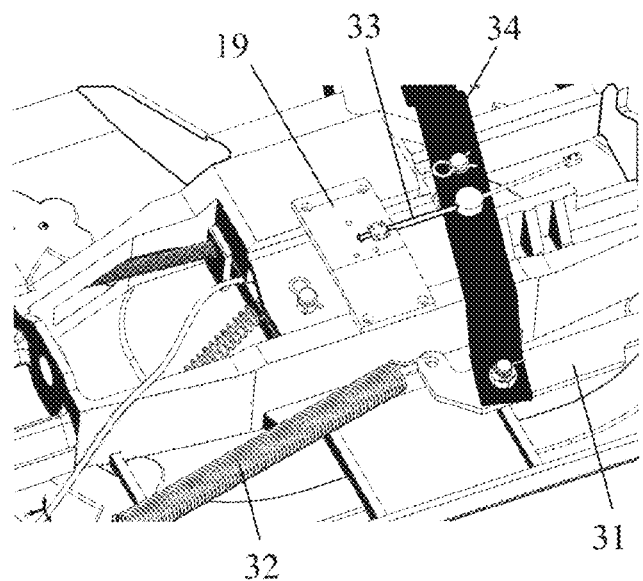
FIG. 8 shows the bottom of the fifth wheel with the handle for locking the kingpin and the displacement means.

FIG. 8 shows the fifth wheel seen from below. The fifth wheel comprises a handle 31 of which an end can be seen in the drawing figure. This handle 31 is used for pretensioning a spring 32 and bringing a locking pawl (not shown in the drawing figure) into a release position. During the coupling of the road tractor to the semi-trailer the kingpin, if the latter nearly finds itself in the fully coupled state, pushes against an activation pin which releases the spring after which the latter extends. When the spring extends, the locking pawl is brought to the locking state. The handle 31 is connected via an arm 34 and a pulling cable 33 connected to this arm to the sensor unit 11 for displacing the sensor unit to the operating position simultaneously with the displacement of the locking pawl.

Figure 9:
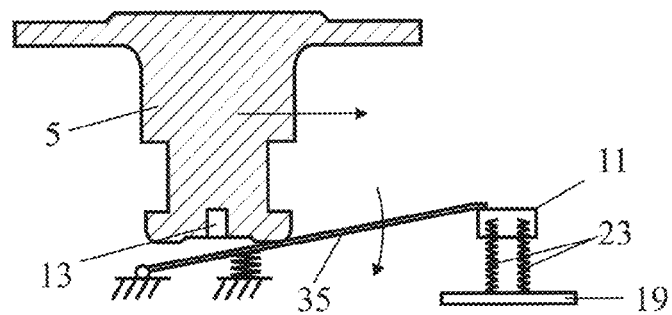
FIG. 9 shows an alternative embodiment of the displacement means.

FIG. 9 shows an alternative embodiment of the displacement means for displacing the sensor unit. In this case the displacement means are formed by a lever 35 against which, during the coupling of the road tractor to the semi-trailer, the kingpin pushes and thus the lever is displaced against a spring force. During this action the lever pushes the sensor unit 11 from the resting position to the operating position (the resting position is in this case the position in which the springs 23 are fully expanded).

Figure 10:
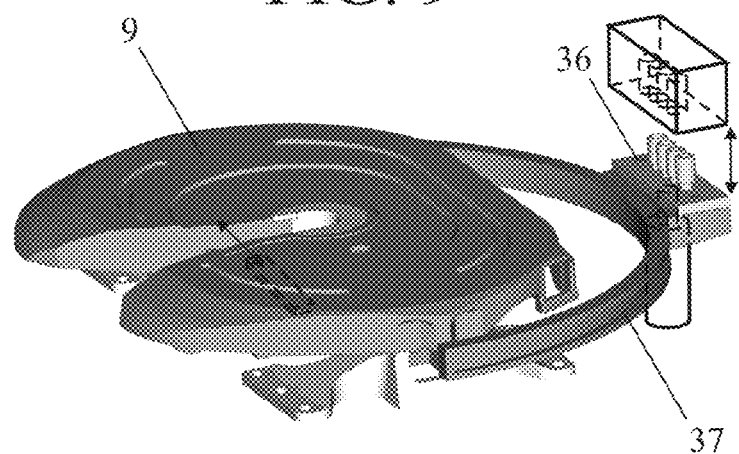
FIG. 10 shows the fifth wheel with plug unit.

The road tractor 7 further includes a plug unit 36 which can be displaced along an arcuate rail 37 by further displacement means (see FIG. 10). The centre of the arc of circle is situated—in the event of a coupled road tractor semi-trailer combination—in the middle of the kingpin. The semi-trailer has a female plug unit (not shown) which is situated at a distance from the centre of the kingpin, which distance equals the radius of the arc of circle along which the rail extends. The road tractor semi-trailer combination further includes a control unit 39 (see FIG. 1) which controls the further displacement means based on the signals received from the sensor unit so as to displace the plug unit to below the female plug unit, as well as coupling means (not shown) for coupling the plug unit to the female plug unit. These coupling means can displace the rail upwards, so that the plug can be inserted into the female plug. The control unit does not operate until the pivot has been lodged completely in the recess.

The control unit can further control, in dependence on the measured position of the kingpin relative to the sensor unit, cornering mirrors and further parts on the road tractor and semi-trailer.

Albeit the invention has been described in the foregoing based on the drawings, it should be observed that the invention is not by any manner or means restricted to the embodiment shown in the drawings. The invention also extends to all embodiments deviating from the embodiment shown in the drawings within the scope defined by the claims.

The invention claimed is:

1. A road tractor semi-trailer combination comprising:
a road tractor having a fifth wheel;
a semi-trailer having a kingpin which can be coupled to the fifth wheel;
a marker in the middle of a bottom of the kingpin that includes a magnet or a coil of electro-conductive wire;
a sensor unit connected to the fifth wheel for detecting the position of the marker relative to the fifth wheel, which sensor unit comprises a sensor that includes a magnet or a coil of electro-conductive wire by which the position of marker can be detected;
a displacement means for displacing the sensor from a resting position to an operating position, wherein in the resting position the sensor is at a first distance from the marker and is incapable of detecting the position of the marker during the coupling and/or immediately after the coupling of the semi-trailer to the road tractor, and wherein in the operating position the sensor is located at a second distance from the marker and the sensor is capable of detecting the position of the marker;
a spring connected to the fifth wheel and pushing the sensor unit in operating position against the bottom of the kingpin.

2. The combination of claim 1, wherein the fifth wheel comprises a bridge element to which the sensor unit is connected.

3. The combination of claim 1, wherein the fifth wheel is provided with a locking pawl which can be displaced between a locking position in which the kingpin is locked in the fifth wheel in coupled state of the road tractor and the semi-trailer, and a release position in which the kingpin can be displaced into and out of the fifth wheel.

4. The combination of claim 3, wherein the fifth wheel is provided with a handle for pre-tensioning a spring and thus displacing the locking pawl from the locking position to the release position, and for transferring the sensor unit from the operating position to the resting position, which spring, when extended, displaces the locking pawl from the release position to the locking position, and thus displaces the sensor unit from the resting position to the operating position.

5. The combination of claim 4, wherein the displacement means comprise a cable by which the sensor unit is connected to the handle.

6. The combination of claim 1, wherein the displacement means comprise a lever against which the kingpin pushes when the road tractor is coupled to the semi-trailer and while doing so displaces the sensor unit from the resting position to the operating position.

7. The combination of claim 6, wherein the fifth wheel is provided with a handle for displacing a locking pawl which locks the kingpin in the fifth wheel in coupled state of road tractor and semi-trailer, where the sensor unit is activated by the handle during or immediately after the displacement of the locking pawl.

8. The combination as of claim 1, wherein the road tractor comprises a plug unit as well as an arcuate rail along which the plug unit can be displaced, where the centre of the arc of circle is located in the centre of the kingpin of the coupled road tractor semi-trailer combination, and the semi-trailer has a female plug unit which is located at a distance from the centre of the kingpin, which distance equals the radius of the arc of circle along which the rail is extended, and in that the road tractor includes a control unit which controls the plug unit based on the signals received from the sensor unit so as to displace the plug unit to below the female plug unit and to couple the plug unit to the female plug unit.

* * * * *